(12) United States Patent
Li et al.

(10) Patent No.: US 11,447,196 B2
(45) Date of Patent: Sep. 20, 2022

(54) ROBOTIC LEG AND ROBOT HAVING THE SAME

(71) Applicant: UBTECH ROBOTICS CORP LTD, Shenzhen (CN)

(72) Inventors: Youpeng Li, Shenzhen (CN); Youjun Xiong, Shenzhen (CN); Hongyu Ding, Shenzhen (CN); Meichun Liu, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 440 days.

(21) Appl. No.: 16/708,464

(22) Filed: Dec. 10, 2019

(65) Prior Publication Data

US 2020/0207432 A1 Jul. 2, 2020

(30) Foreign Application Priority Data

Dec. 29, 2018 (CN) .......................... 201811636447.2

(51) Int. Cl.
*B62D 57/032* (2006.01)
*B25J 9/10* (2006.01)
*B25J 18/00* (2006.01)

(52) U.S. Cl.
CPC ............ *B62D 57/032* (2013.01); *B25J 9/106* (2013.01); *B25J 18/00* (2013.01)

(58) Field of Classification Search
CPC .......... B62D 57/032; B25J 9/106; B25J 18/00
See application file for complete search history.

(56) References Cited

U.S. PATENT DOCUMENTS

| | | | |
|---|---|---|---|
| 6,244,644 B1 * | 6/2001 | Lovchik | B25J 15/0009 901/29 |
| 8,761,927 B2 * | 6/2014 | Johnson | B25J 17/0266 901/23 |
| 2005/0167167 A1 | 8/2005 | Miyazaki et al. | |
| 2012/0152051 A1 * | 6/2012 | Johnson | B25J 17/0266 901/29 |
| 2015/0101871 A1 * | 4/2015 | Riskas | F15B 21/085 60/431 |
| 2016/0278947 A1 * | 9/2016 | Martin | A61F 2/70 |
| 2019/0175365 A1 * | 6/2019 | Herr | A61F 2/68 |

FOREIGN PATENT DOCUMENTS

JP 2003266358 A * 9/2003

* cited by examiner

*Primary Examiner* — Zakaria Elahmadi

(57) ABSTRACT

A robotic leg assembly includes a main body having a first end and an opposite second end, a first servo arranged at the first end of the main body, a second servo connected to the main body and comprising an output shaft, a servo holder arranged at the second end of the main body, a third servo received in the servo holder, and a linkage bar mechanism. Each of a first initial angle of the first rotary member and a second initial angle of the second rotary member is in a predetermined range.

17 Claims, 8 Drawing Sheets

ROBOTIC LEG AND ROBOT HAVING THE SAME

CROSS REFERENCE TO RELATED APPLICATIONS

This application claims priority to Chinese Patent Application No. 201811636447.2, filed Dec. 29, 2018, which are hereby incorporated by reference herein as if set forth in its entirety.

BACKGROUND

1. Technical Field

The present disclosure generally relates to robots, and particularly to a robotic leg having improved linkage bar mechanism and a robot including the arm.

2. Description of Related Art

Humanoid robots are well known and typically include a linkage bar mechanism for dorsiflexion/plantarflexion of each foot. Generally, the range of dorsiflexion is greater than that of the plantarflexion. Although conventional linkage bar mechanism can meet basic requirement, there is still a need for a robotic leg assembly having a new linkage bar mechanism.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
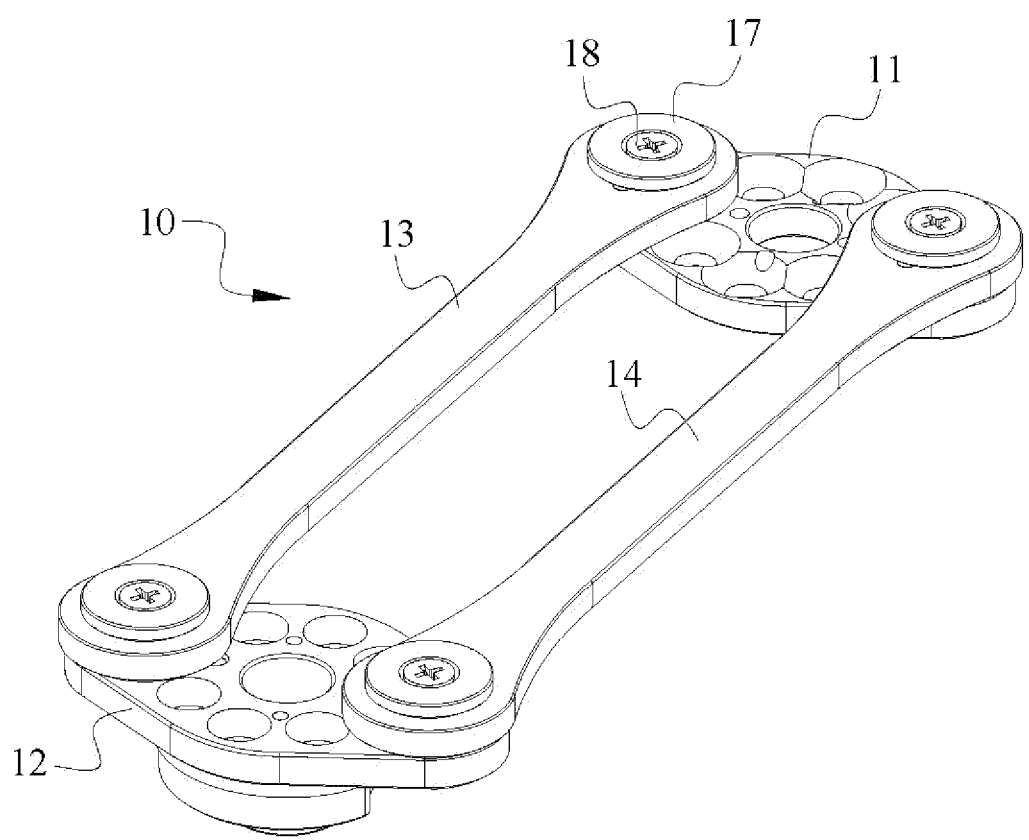
FIG. 1 is an isometric view of a linkage bar mechanism of a robotic leg assembly according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
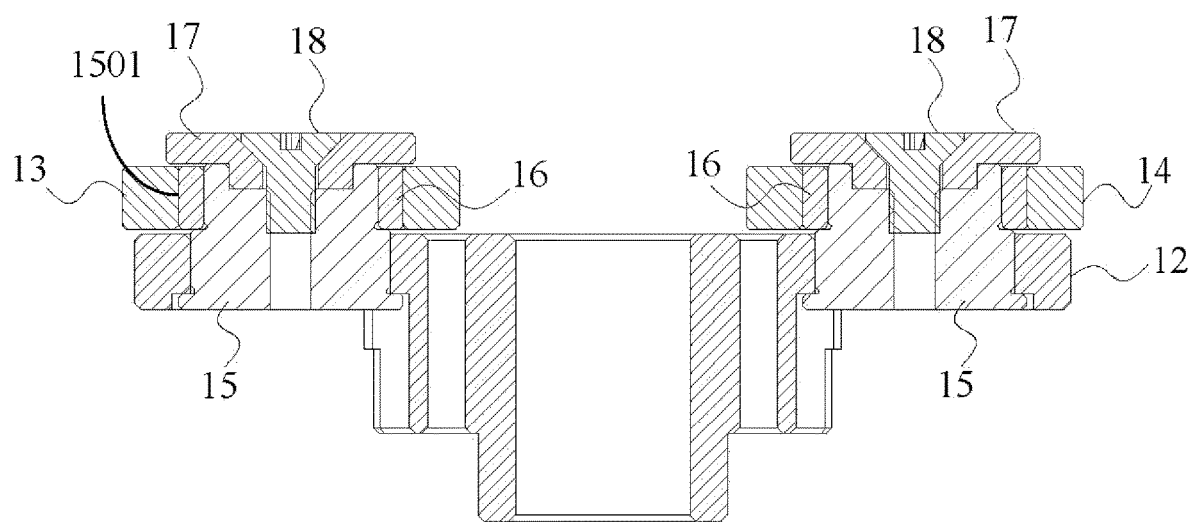
FIG. 2 is a planar cross-sectional view of the linkage bar mechanism of FIG. 1.
Figure 5:
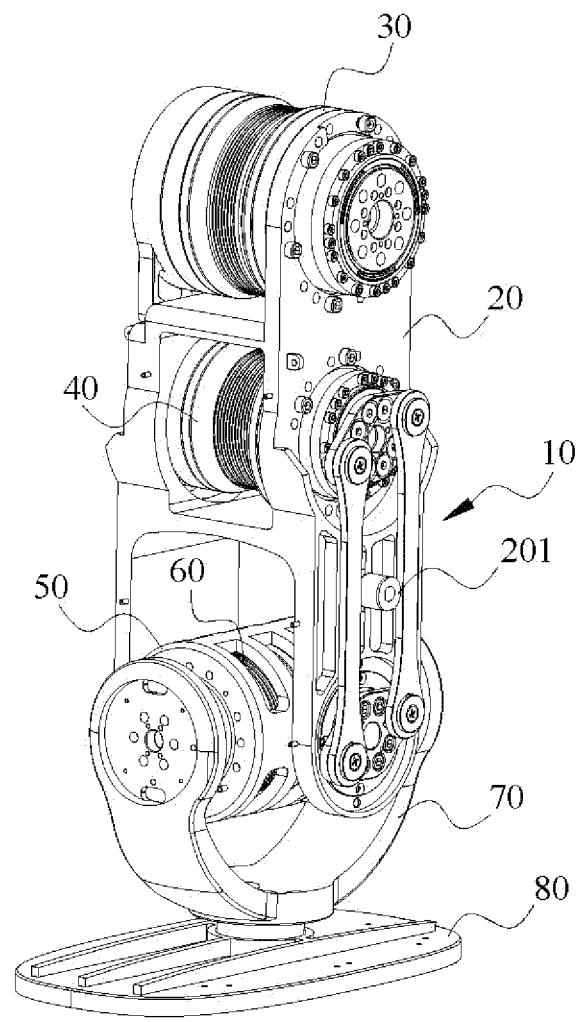
FIG. 5 is an isometric view of a robotic leg assembly including the linkage bar mechanism of FIG. 1 according to an embodiment.

Referring to FIGS. 1, 2 and 5, in one embodiment, a robotic leg includes a main body 20, a first servo or knee servo 30, a second servo or primary ankle servo 40, a servo holder 50, a third servo or secondary ankle servo 60, and a linkage bar mechanism 10. The main body 20 has a top end and an opposite bottom end. The first servo 30 is arranged at the top end of the main body 20. The second servo 40 is connected to the main body 20 and includes an output shaft. The servo holder 50 is arranged at the bottom end of the main body 20. The third servo 60 is received in the servo holder 50.

The linkage bar mechanism 10 includes a first rotary member 11, a second rotary member 12, a first linkage bar 13, and a second linkage bar 14. The first rotary member 11 is fixed to the output shaft of the second servo 40. The second rotary member 12 is rotatably connected to the main body 20 and opposes the first rotary member 11. The servo holder 50 is fixed to the second rotary member 12. The first linkage bar 13 has two opposite ends that are respectively rotatably connected to the first rotary member 11 and the second rotary member 12. The second linkage bar 14 opposes the first linkage bar 13 and has two opposite ends that are respectively rotatably connected to the first rotary member 11 and the second rotary member 12. The first rotary member 11, the second rotary member 12, the first linkage bar 13 and the second linkage bar 14 corporately constitute a four-bar linkage mechanism.

Each of a first initial angle and a second initial angle is in a predetermined range. The first initial angle is formed between an imaginary plane, which passes through an axis of rotation of the first rotary member 11 and an axis of rotation about which one of the first linkage bar 13 and the second linkage bar 14 rotates with respect to the first rotary member 11, and a first horizontal plane passing through the axis of rotation of the first rotary member 11. The second initial angle is formed between an imaginary plane, which passes through an axis of rotation of the second rotary member 12 and an axis of rotation about which one of the first linkage bar 13 and the second linkage bar 14 rotates with respect to the second rotary member 12, and a second horizontal plane passing through the axis of rotation of the second rotary member 12. The first initial angle and the second initial angle are both measured when the robotic leg assembly is in an upright orientation as shown in FIG. 5.

Figure 6:
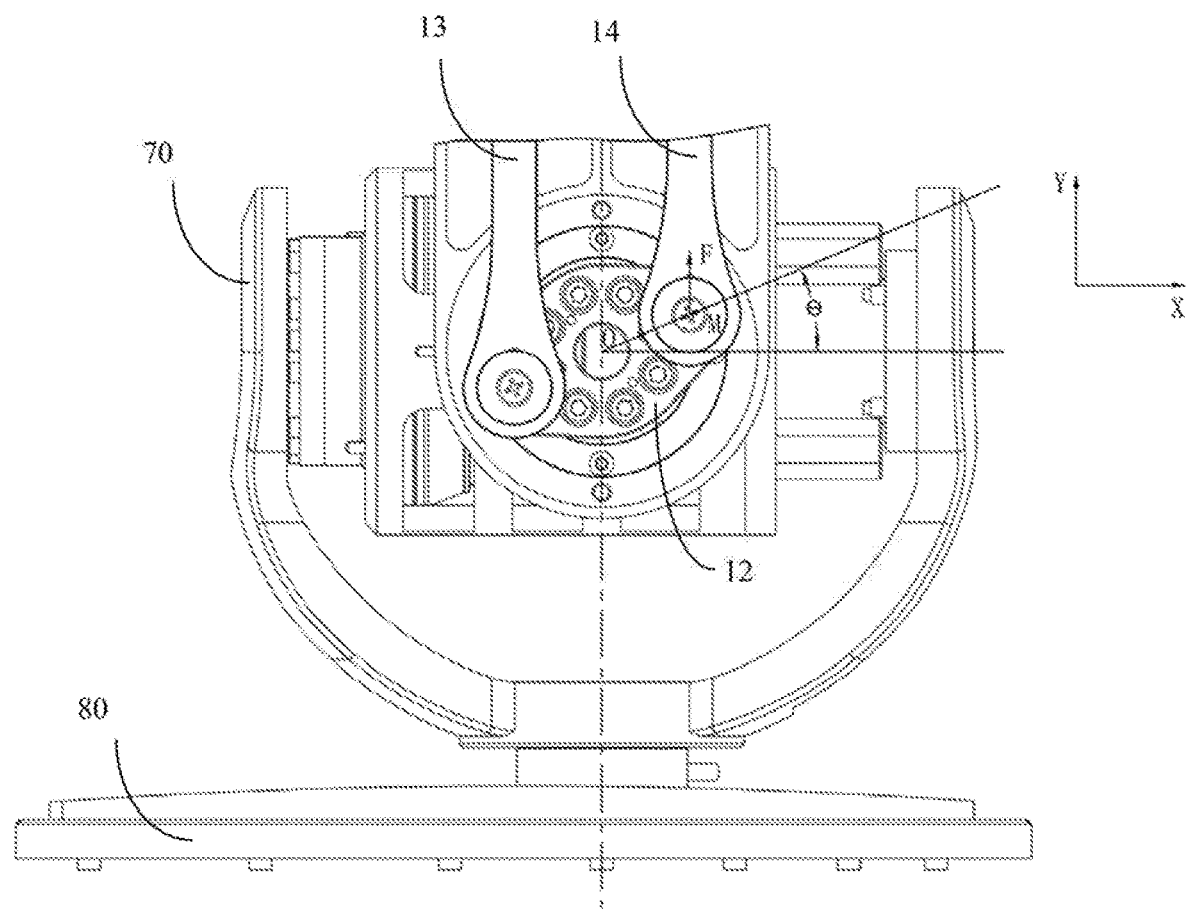
FIG. 6 is a planar partial view of the robotic leg assembly of FIG. 5.

Descriptions of the force acting on the second linkage bar 14 will now be made with reference to FIG. 6. The torque T outputted by the second servo 40 equals to the product of F, S and $\cos\Theta$, where F represents the force acting on the second linkage bar 14, S represents the x-coordinate of the center of rotation about which the second linkage bar 14 rotates with respect to the second rotary member 12, and $\Theta$ represents the angle formed between the line passing through the center of rotation above and the origin of the coordinate system and the X axis of the coordinate system, that is, the second initial angle. It is then clear that when the torque T is constant, the force F increases as the angle θ increases. The same applies to the relationship between the force acting on the first linkage bar 13 and the first initial angle. With this considered, the first initial angle and the second initial angle are both in a predetermined range so as to reduce the pulling/pushing force acting on the first linkage bar 13 and the second linkage bar 14.

With such configuration, the linkage bar mechanism 10 allows a foot 80 connected to the leg assembly to be rotated upward to a preset position without a large rotation, which can effectively reduce the pushing/pulling force acting on the first linkage bar 13 and the second linkage bar 14.

In one embodiment, the imaginary line connecting the upper center of rotation of the first linkage bar 13 and the upper center of rotation of the second linkage bar 14 is parallel to the imaginary line connecting the lower center of rotation of the first linkage bar 13 and the lower center of rotation of the second linkage bar 14. The imaginary line connecting the upper center of rotation and the lower center of rotation of the first linkage bar 13 is parallel to the imaginary line connecting the upper center of rotation and the lower center of rotation of the second linkage bar 14. That is, the four-bar linkage mechanism 10 is a parallelogram four-bar linkage mechanism, which is easy to control. It should be noted that, in other embodiments, the first rotary member 11, the first linkage bar 13, the second rotary member 12, and the second linkage bar 14 may constitute other form of four-bar linkage bar mechanism according to need.

In one embodiment, the initial angles of the first rotary member 11 and the second rotary member 12 are both in the range of 15 to 30 degrees. Preferably, the initial angles equal to 22.5 degrees. That is, in an initial state when the first rotary member 11 and the second rotary member 12 are in their initial position, the initial angles equal to 22.5 degrees, which can reduce the pulling/pushing force acting on the first linkage bar 13 and the second linkage bar 14. In other embodiments, the initial angles may be changed to 15, 20 or 30 degrees according to need.

In one embodiment, the linkage bar mechanism further includes a number of axles 15 and a number of sleeves 16. Each axle 15 rotatably passes through the first rotary member 11 or the second rotary member 12 and includes a linkage connection portion 1501. The sleeves 16 respectively rotatably arranged around the linkage connection portions 1501 of the axles 15. Each of the sleeves 16 are fixedly embedded in the first linkage bar 13 or the second linkage bar 14. With such arrangement, the first linkage bar 13 and the second linkage bar 14 each are rotatably connected to the first rotary member 11 and the second rotary member 12. In the embodiment, the axles 15 are four in number, and the sleeves 16 are four in number. Each of the first rotary member 11 and the second rotary member 12 defines two through holes in opposite ends thereof. As shown in FIG. 2, a portion of each axle 15 is in interference fit with a corresponding one of the through holes, with the linkage connection portions 1501 protruding from the first rotary member 11 and the second rotary member 12. The linkage connection portions 1501 are rotatably received in the sleeves 16 in the first linkage bar 13 and the second linkage bar 14.

Figure 4:
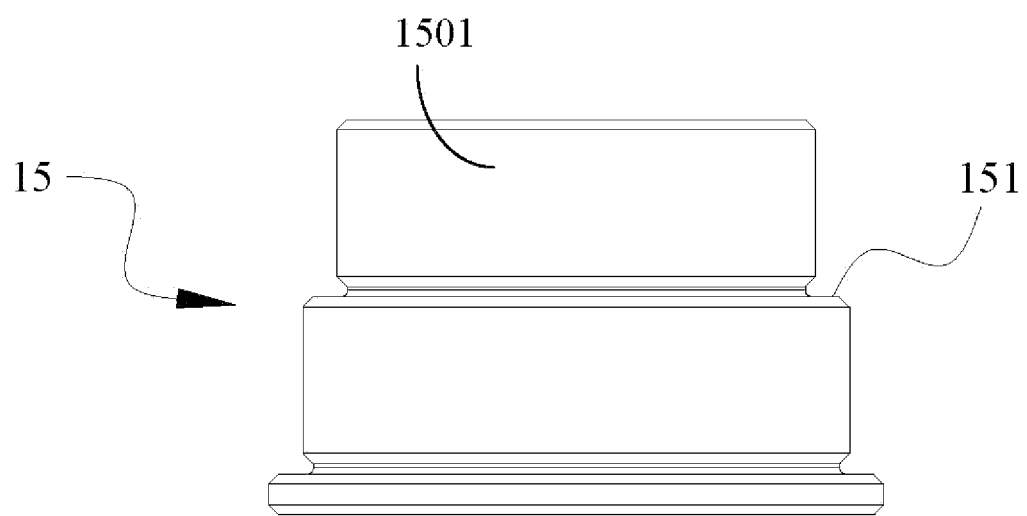
FIG. 4 is a planar side view of an axle of the linkage bar mechanism of FIG. 1.

Referring to FIG. 4, in one embodiment, each of the axles 15 has a first step surface 151 around the linkage connection portion 1501 thereof. The lower ends of the sleeves 16 respectively abut against the step surfaces 151, which facilitates axial positioning of the sleeves 16. The first step surfaces 151 are higher than top surfaces of the first linkage bar 13 and the second linkage bar 14, which prevents the first linkage bar 13, the second linkage bar 14 and the sleeves 16 from contacting the first rotary member 11 and the second rotary member 12 during rotation. In the embodiment, the lower ends of the first linkage bar 13, the second linkage bar 14 and the sleeves 16 are flush with one another and spaced apart from the first rotary member 11 and the second rotary member 12.

Figure 3:
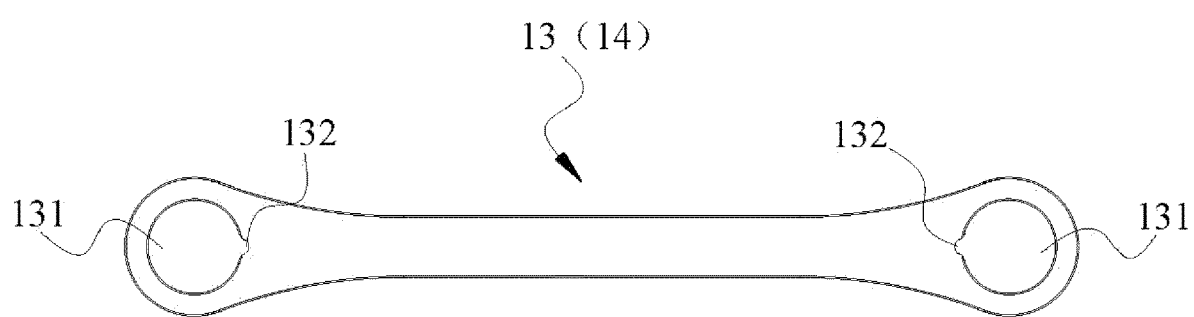
FIG. 3 is planar view of a first linkage bar and a second linkage bar of the linkage bar mechanism of FIG. 1.

Referring to FIG. 3, in one embodiment, each of the first linkage bar 13 and the second linkage bar 14 defines two first through holes 131 in opposite ends thereof. The sleeves 16 are tightly fit in the first through holes 131. A notch 132 is formed in a lateral surface of each of the first through holes 131. In the embodiment, since the strength of the first linkage bar 13 and the second linkage bar 14 at the notch 132 is higher than other regions, the deformation of the link sleeve 16 near the notch 132 is maximum after the sleeves 16 are pressed into the first through holes 131. Therefore, the arranged of the notch 132 in the first linkage bar 13 and the second linkage bar 14 ensures the roundness of the through holes 131, thereby reducing the wear of the sleeves 16 and the axles 15.

Figure 8:
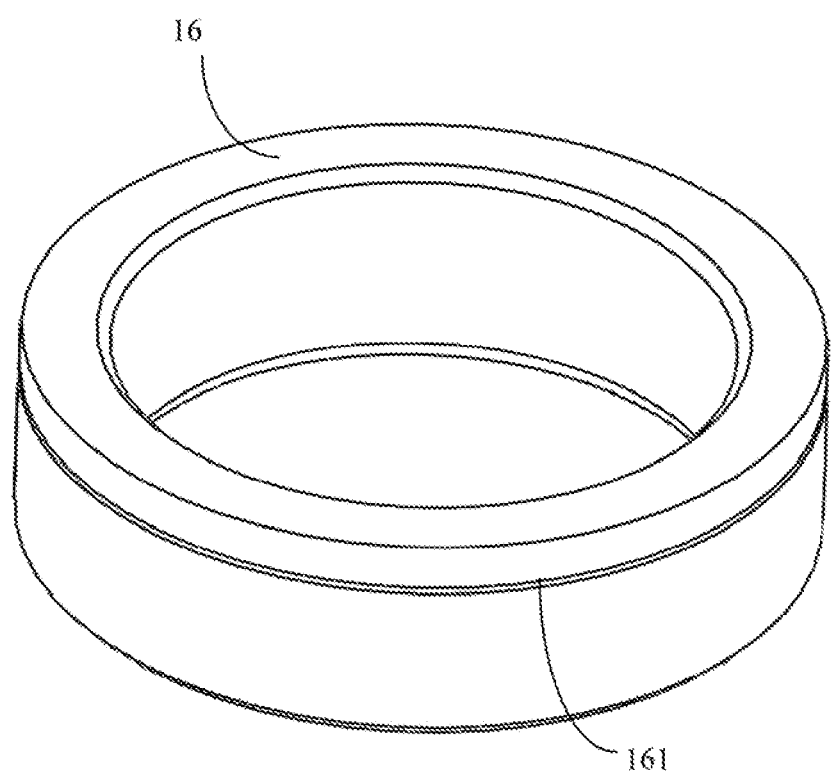
FIG. 8 is an isometric enlarged view of a sleeve of the linkage bar mechanism of FIG. 2.

In one embodiment, each of the sleeves 16 includes a second step surface 161 (see FIG. 8) so as to facilitate insertion of the sleeves 16 into the through holes 131 of the first linkage bar 13 and the second linkage bar 14. The second step surfaces are used for positioning.

In one embodiment, in order to limit the axial positions of the first linkage bar 13 and the second linkage bar 14, and prevent the first linkage bar 13 and the second linkage bar 14 from axially disengaging from the axles 15, each axle 15 includes a cap 17 and a fastener 18. Each cap 17 includes a shaft received in a corresponding axle 15. A stepped hole is defined in each axle 15 and extends along the lengthwise direction of the axle 15. The shaft of each cap 17 is received in a larger-diameter hole of a corresponding stepped hole. Each of the fasteners 18 is used to fix a corresponding cap 17 to a corresponding axle 15. Specifically, a through hole is defined in each cap 17, and each fastener 18 passes through the through hole of a corresponding cap 17 and then screwed into the smaller-diameter of a corresponding stepped hole of the axle 15.

In one embodiment, the caps 17 are four in number, and the fastens 18 are screws and four in number.

In one embodiment, the lower end surfaces of the caps 17 are spaced apart from the upper end surfaces of the sleeves 16. That is, gaps are formed between the lower end surfaces of the caps 17 and the upper end surfaces of the sleeves 16 so as to avoid friction between the caps 17 and the sleeves 16. In the embodiment, the upper end surfaces of the sleeves 16 are flush with the upper end surfaces of first linkage bar 13 and the second linkage bar 14. Thus, gaps are formed between the lower end surfaces of the caps 17 and the upper end surfaces of the first linkage bar 13 and the second linkage bar 14.

In one embodiment, the first servo 30 and the second servo 40 are parallel to each other. The servo holder 50 and the third servo 60 are perpendicular to the second servo 40. The servo holder 50 rotates together with the second rotary member 12, which then drives the third servo 60 to rotate. in the embodiment, the second rotary member 12 and the servo holder 50 are connected to each other via fasteners, such as screws.

In one embodiment, the robotic leg assembly further includes a foot connection member 70, a foot 80 and an ankle sensor. The foot connection member 70 is U-shaped.

One end of the foot connection member 70 is fixed to the output shaft of the third servo 60 and rotates together with the output shaft. The other opposite end of the foot connection member 70 is rotatably connected to the servo holder 50. It should be noted that the servo holder 50, the third servo 60, the foot connection member 70 and the foot 80, as a whole, rotate forward and backward when driven by the second rotary member 12, while the foot connection member 70 and the foot 80, as a whole, rotate laterally when driven by the third servo 60. The foot 80 is coupled to the intermediate position of the ankle foot connection member 70. The ankle sensor is arranged at the junction where the foot connection member 70 is connected to the foot 80.

In one embodiment, the main body 20 includes a protrusion 201 between the first linkage bar 13 and the second linkage bar 14. The protrusion 201 is used to stop movement of the first linkage bar 13 or the second linkage bar 14 when the first linkage bar 13 or the second linkage bar 14 comes into contact with the protrusion 201. In the embodiment, the protrusion 201 is located in an intermediate region between the first rotary member 11 and the second rotary member 12. The protrusion 201 is cylindrical and is vertically fixed to the main body 20 by a screw.

Figure 7:
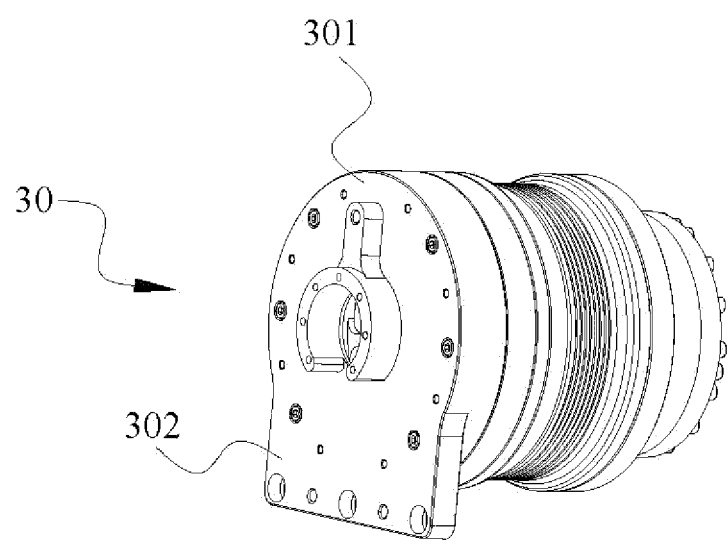
FIG. 7 is an isometric view of a first servo of the robotic leg assembly of FIG. 5.

Referring to FIG. 7, in one embodiment, the first servo 30 includes a housing 301 of irregular shape. The housing 301 includes a tab 302 at an end thereof, and the tab 302 is connected to the main body 20 via fasteners. In the embodiment, the tab 302 and the housing 301 are integrally formed with each other so as to simplify the structure and save cost.

In one embodiment, the present disclosure further provides a robot including a leg assembly as described above. It should be noted that the robot may further include a thigh, a waist, a hand, and a head, which are not described in detail herein.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robotic leg assembly comprising:
   a main body having a first end and an opposite second end;
   a first servo arranged at the first end of the main body;
   a second servo connected to the main body and comprising an output shaft;
   a servo holder arranged at the second end of the main body:
   a third servo received in the servo holder; and
   a linkage bar mechanism comprising:
      a first rotary member fixed to the output shaft of the second servo;
      a second rotary member rotatably connected to the main body and opposing the first rotary member, the servo holder being fixed to the second rotary member;
      a first linkage bar having two opposite ends that are respectively rotatably connected to the first rotary member and the second rotary member; and
      a second linkage bar opposing the first linkage bar and having two opposite ends that are respectively rotatably connected to the first rotary member and the second rotary member; wherein the first rotary member, the second rotary member, the first linkage bar and the second linkage bar corporately constitute a four-bar linkage mechanism, each of a first initial angle of the first rotary member and a second initial angle of the second rotary member is in a predetermined range, the first initial angle is formed between an imaginary plane, which passes through an axis of rotation of the first rotary member and an axis of rotation about which one of the first linkage bar and the second linkage bar rotates with respect to the first rotary member, and a first horizontal plane passing through the axis of rotation of the first rotary member, and the second initial angle is formed between an imaginary plane, which passes through an axis of rotation of the second rotary member and an axis of rotation about which one of the first linkage bar and the second linkage bar rotates with respect to the second rotary member, and a second horizontal plane passing through the axis of rotation of the second rotary member, the first initial angle and the second initial angle are both measured when the robotic leg assembly is in an upright orientation;
   wherein the linkage bar mechanism further comprises:
      a plurality of axles, each of which rotatably passes through the first rotary member or the second rotary member and comprises a linkage connection portion;
      a plurality of sleeves respectively rotatably arranged around the linkage connection portions of the axles, each of the plurality of sleeves being fixedly embedded in the first linkage bar or the second linkage bar;
   wherein each of the axles comprises a first step surface around the linkage connection portion thereof, lower ends of the sleeves respectively abut against the step surfaces of the axles, the first step surfaces are higher than top surfaces of the first linkage bar and the second linkage bar.

2. The robotic leg assembly according to claim 1, wherein the four-bar linkage mechanism is a parallelogram four-bar linkage mechanism.

3. The robotic leg assembly according to claim 1, wherein the predetermined range is from 15 to 30 degrees.

4. The robotic leg assembly according to claim 3, wherein each of the first initial angle and the second initial angle equals to 22.5 degrees.

5. The robotic leg assembly according to claim 1, wherein each of the sleeves comprises a second step surface so as to facilitate insertion of the sleeves into the first linkage bar and the second linkage bar.

6. The robotic leg assembly according to claim 1, wherein each of the first linkage bar and the second linkage bar defines two first through holes in opposite ends thereof, the sleeves are tightly fit in the first through holes, and a notch is formed in a lateral surface of each of the first through holes.

7. The robotic leg assembly according to claim 1, wherein the linkage bar mechanism further comprises a plurality of caps and a plurality of fasteners configured to connect the caps to the axles.

8. The robotic leg assembly according to claim 7, wherein each of the caps comprises a lower surface that is spaced apart from a top surface of a corresponding one of the sleeves.

9. The robotic leg assembly according to claim 1, wherein the main body comprises a protrusion between the first linkage bar and the second linkage bar, and the protrusion is configured to stop movement of the first linkage bar or the second linkage bar when the first linkage bar or the second linkage bar comes into contact with the protrusion.

10. The robotic leg assembly according to claim 1, wherein the first servo comprises a housing, the housing comprises a tab at an end thereof, and the tab is connected to the main body.

11. A robot comprising:
a leg assembly comprising:
a main body having a first end and an opposite second end;
a first servo arranged at the first end of the main body;
a second servo connected to the main body and comprising an output shaft;
a servo holder arranged at the second end of the main body;
a third servo received in the servo holder; and
a linkage bar mechanism comprising:
a first rotary member fixed to the output shaft of the second servo;
a second rotary member rotatably connected to the main body and opposing the first rotary member, the servo holder being fixed to the second rotary member;
a first linkage bar having two opposite ends that are respectively rotatably connected to the first rotary member and the second rotary member; and
a second linkage bar opposing the first linkage bar and having two opposite ends that are respectively rotatably connected to the first rotary member and the second rotary member; wherein the first rotary member, the second rotary member, the first linkage bar and the second linkage bar corporately constitute a four-bar linkage mechanism;
a plurality of axles, each of which rotatably passes through the first rotary member or the second rotary member and comprises a linkage connection portion;
a plurality of sleeves respectively rotatably arranged around the linkage connection portions of the axles, each of the plurality of sleeves being fixedly embedded in the first linkage bar or the second linkage bar;
wherein each of the axles comprises a first step surface around the linkage connection portion thereof, lower ends of the sleeves respectively abut against the step surfaces of the axles, the first step surfaces are higher than top surfaces of the first linkage bar and the second linkage bar.

12. The robot according to claim 11, wherein each of the sleeves comprises a second step surface so as to facilitate insertion of the sleeves into the first linkage bar and the second linkage bar.

13. The robot according to claim 11, wherein each of the first linkage bar and the second linkage bar defines two first through holes in opposite ends thereof, the sleeves axe tightly fit in the first through holes, and a notch is formed in a lateral surface of each of the first through holes.

14. The robot according to claim 11, wherein the linkage bar mechanism further comprises a plurality of caps and a plurality of fasteners configured to connect the caps to the axles.

15. The robot according to claim 14, wherein each of the caps comprises a lower surface that is spaced apart from a top surface of a corresponding one of the sleeves.

16. The robot according to claim 11, wherein the main body comprises a protrusion between the first linkage bar and the second linkage bar, and the protrusion is configured to stop movement of the first linkage bar or the second linkage bar when the first linkage bar or the second linkage bar comes into contact with the protrusion.

17. The robot according to claim 11, wherein the first servo comprises a housing, the housing comprises a tab at an end thereof, and the tab is connected to the main body.

\* \* \* \* \*